United States Patent [19]

Kastl et al.

[11] Patent Number: 4,940,614
[45] Date of Patent: Jul. 10, 1990

[54] TUBULAR CASING HAVING AN ADHESIVE TAPE IN THE DIRECTION OF ITS LONGITUDINAL AXIS

[75] Inventors: Erna Kastl, Niedernhausen; Marion Mathieu, Mainz-Kastel; Anton Goerres, Eppstein-Vockenhausen, all of Fed. Rep. of Germany

[73] Assignee: Hoechst Aktiengesellschaft, Frankfurt/Main, Fed. Rep. of Germany

[21] Appl. No.: 335,769

[22] Filed: Apr. 10, 1989

[30] Foreign Application Priority Data

Apr. 13, 1988 [DE] Fed. Rep. of Germany ....... 8804813

[51] Int. Cl.⁵ .................... F16L 11/00; A22C 13/00
[52] U.S. Cl. ................................ 428/348; 138/118.1; 138/156; 138/170; 426/105; 426/135; 428/43
[58] Field of Search ................. 138/118.1, 128, 156, 138/170; 428/34.8, 43, 532; 426/105, 135, 140

[56] References Cited

U.S. PATENT DOCUMENTS

| | | | |
|---|---|---|---|
| 4,401,135 | 8/1983 | Andra et al. | 138/118.1 |
| 4,401,136 | 8/1983 | Porrmann et al. | 138/118.0 |
| 4,410,011 | 10/1983 | Andra et al. | 138/118.1 |
| 4,478,670 | 10/1984 | Heyse et al. | 156/380.1 |
| 4,563,231 | 1/1986 | Porrmann et al. | 156/90 |
| 4,746,391 | 5/1988 | Heyse et al. | 156/359 |

FOREIGN PATENT DOCUMENTS

| | | |
|---|---|---|
| 0155541 | 9/1985 | European Pat. Off. . |
| 3139481 | 5/1983 | Fed. Rep. of Germany . |
| 3244372 | 6/1984 | Fed. Rep. of Germany . |
| 3720256 | 1/1988 | Fed. Rep. of Germany . |
| 2126191 | 3/1984 | United Kingdom . |

Primary Examiner—James Seidleck
Attorney, Agent, or Firm—Foley & Lardner, Schwartz, Jeffery, Schwaab, Mack, Blumenthal & Evans

[57] ABSTRACT

A tubular food casing comprising a film which has been bent to form a tubing, the longitudinal edges of which are joined to one another by means of an adhesive tape, which forms a glued seam. The adhesive tape comprises a plurality of incisions, ending in the area of the glued seam, which extend transversely to its longitudinal direction. In the area of the incision ends, the adhesive tape is firmly bonded to the film. The bond strength between the adhesive tape and the film is greater than the tear resistance of the film.

20 Claims, 1 Drawing Sheet ical the adhesive tape to with a firmly ideal, may include, of the detailed description should be limited to the preferred embodiments.

TUBULAR CASING HAVING AN ADHESIVE TAPE IN THE DIRECTION OF ITS LONGITUDINAL AXIS

BACKGROUND OF THE INVENTION

The present invention relates to a tubular food casing, in particular an artificial sausage casing, formed from a film bent into tubular form and sealed with an adhesive tape.

Tubular casings of this kind are disclosed, for example, in U.S. Pat. Nos. 4,401,135 and 4,401,136; the manufacture of these casings is described, in particular, in U.S. Pat. No. 4,478,670 and in DE-A 32 44 372; and a device for the manufacture thereof is described in U.S. Pat. No. 4,746,391.

These tubular casings have the disadvantage that it is difficult to peel them from a filling, in particular from sausage meat, in a spiral manner, i.e. in the direction of the tubing circumference. Tearing of the tubular film usually stops at the adhesive tape which extends along the longitudinal axis of the tubing, across the track of tearing, such that further tearing of the film is rendered practically impossible. The adhesive tape must be cut with a tool, before tearing of the film can be resumed.

SUMMARY OF THE INVENTION

It is therefore an object of the present invention to improve tubular casings having an adhesive tape, in such a way that the casings can be removed from a filling without difficulty.

In accomplishing the foregoing objective, there has been provided, in accordance with one aspect of the present invention, a tubular food casing comprising a film bent to form a tubing and an adhesive tape extending in the longitudinal direction of the tubing, the adhesive tape joining those edges of the film which extend in the longitudinal direction of the tubing such that a glued seam is formed between the adhesive tape and the edges, wherein the adhesive tape comprises a plurality of incisions extending transversely from at least one longitudinal edge of the tape, wherein each of the incisions terminates at a point located within the glued seam, and wherein the bond strength between the adhesive tape and the film is greater than the tear resistance of the film.

In accordance with another aspect of the present invention there is provided a sausage product comprising a sausage meat emulsion and a casing as described above.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing form the spirit thereof, and the invention includes all such modifications.

BRIEF DESCRIPTION OF THE DRAWINGS

The invention is explained in detail with reference to FIGS. 1 and 2.

DETAILED DESCRIPTION OF THE PREFERRED EMBODIMENTS

Figure 1:
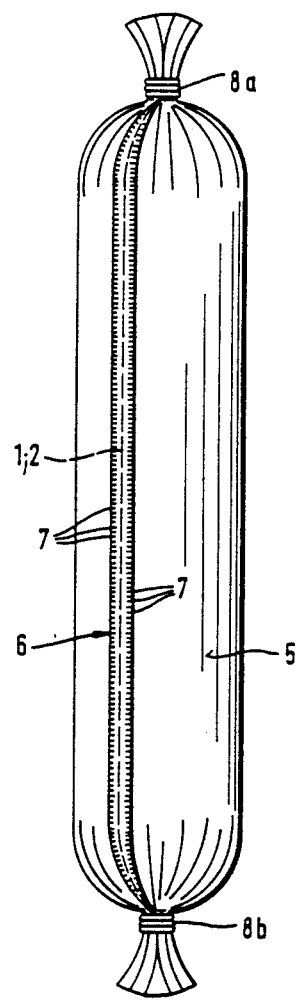
FIG. 1 shows a side view of a preferred embodiment, a sausage casing, in the filled state.
Figure 2:
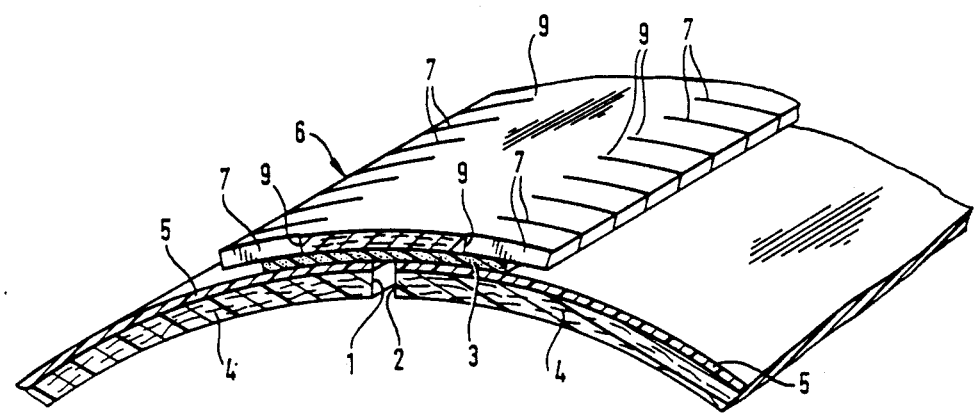
FIG. 2 shows an enlarged cross-sectional view of the seam area of the sausage casing of FIG. 1.

The sausage casing comprises a film 4 (FIG. 2) carrying an external coating layer 5 and being bent to form a tubing, and the support film 6 of the adhesive tape which overlaps the edges 1, 2 of the film 4. The edges 1, 2 have here been drawn together to form a butt joint. The support film 6 shows a plurality of incisions 7 (FIG. 2) which extend approximately perpendicularly to the longitudinal direction of the adhesive tape and in parallel with one another and are present at both edges of the support film 6. In FIG. 2, the width of adhesive layer 3 which corresponds to the width of the glued seam and the length of the incisions 7 are chosen in such a way that the support film 6 adheres firmly to the surface layer 5 of the film 4, at the ends 9 of the incisions 7. The sausage casing is closed at its ends by means of metal clips, 8a, 8b (FIG. 1).

In another preferred embodiment, reference numeral 3 indicates a heat sealing layer, and the coating layer 5 then comprises a heat-sealable material.

The tubular casing serves for the packaging of pasty foodstuffs and is, in particular, an artificial sausage casing made of a non-edible material which must be removed prior to consumption. The casing comprises a film which has been bent into a tubing and has the shape of a circular cylinder in the filled state. In the manufacture of the tubular casing, an initially sheet-shaped or web-shaped film blank or an endless film web is bent about its longitudinal axis. The edge zones which extend in the direction of the longitudinal axis of the tubing and adjoin each other as a result of this bending operation are joined to one another in the region of the butt seam by means of an adhesive tape which overlaps the two edge zones and follows the course of the butt seam. The adhesive tape is present on the outside or inside of the tubular casing and comprises a support film and, if required, a sealing or adhesive layer.

It is essential that the adhesive tape exhibit a plurality of incisions extending transversely, in particular perpendicularly, with respect to the longitudinal direction of the adhesive tape. It is particularly advantageous to use adhesive tapes having support films of feather-like configuration. The incisions permit uninterrupted tearing of the film of the tubular casing in the area of the adhesive tape since, within a cut, the adhesive tape breaks and tearing goes on.

In order for the casing to be perfectly removable, it is also necessary that the adhesive tape, at least in the area of the incision ends, be firmly bonded to the film of the tubular casing, i.e. the glued seam must be at least so wide that the adhesive tape adheres firmly to the film over a portion of the respective incision length, viz. at the ends of the incisions. This is particularly important in those cases, in which bonding of the adhesive tape to the film does not cover the entire width, i.e. the entire surface, of the adhesive tape. The bond strength between the adhesive tape and the film must moreover be greater than the tear resistance of the film since, otherwise, the adhesive tape would become detached from the film before the latter tears, in the process of peeling off the casing.

The angle included between the appropriately rectilinear incisions and the longitudinal axis of the adhesive tape should be at least 30°; it is, however, expedient to have angles exceeding 60°.

The incisions are, in general, present at both edges of the adhesive tape, which means that the direction of tearing can be chosen at discretion, when peeling the casing from the filling. The mutual distance between the incisions should be as small as possible, such that the adhesive tape can be broken and torn virtually at any point. For this purpose, the mutual distance should not exceed about 1 cm, in particular 0.5 cm. For reasons of fabrication, the minimum spacing is about 0.5 mm. It is not necessary for the incisions to be particularly long, since even very short lengths permit tearing of the adhesive tape. In a 6 to 15 mm, in particular, 8 to 12 mm wide adhesive tape, the length of incision need not be greater than 2 mm, in particular 1 mm. Lengths of 0.5 mm or even 0.3 mm are already sufficient. The incisions can also have the shape of recesses, notches, openings and the like, which are wedge-shaped or tapered to a point.

The film material of which the tubular casing is formed has the thickness conventionally used for flexible packagings, in particular sausage casings, and comprises single-layer or multi-layer plastic or cellulose films as customarily employed for these purposes. If required, the cellulose films are provided with a fiber reinforcement. If the adhesive tape is attached by means of heat sealing, the film is made of a sealable material or has at least a sealable surface layer, in particular, in the area of the seam. Suitable films exhibit, for example, the following layer arrangements: polyamide/PVDC (polyvinylidene chloride), polyamide/PE, PVDC/polyamide/PE, PVDC/polyvinyl alcohol/PVDC, polyester/PVDC, polyvinyl alcohol/PE, cellulose/PVDC. The PVDC layer serves as a gas barrier and as a sealing layer.

The support film of the adhesive tape expediently comprises the same material as the film of the tubular casing. This means that the support film is made of a sealable material or has a sealing or adhesive layer on that surface which enters into contact with the film of the tubular casing. The layer applied to one surface of the support film of the adhesive tape is, for example, formed of a pressure-sensitive adhesive, but preferably comprises a heat sealing layer which produces the required firm bond with the film of the tubular casing.

What is claimed is:

1. A tubular food casing comprising a film bent to form a tubing and an adhesive tape extending in the longitudinal direction of said tubing, said adhesive tape joining the edges of said film which extend in the longitudinal direction of said tubing such that a glued seam is formed between said adhesive tape and said edges, wherein said adhesive tape comprises a plurality of incisions extending transversely from at least one longitudinal edge of said tape, wherein each of said incisions terminates at a point located within said glued seam, and wherein the bond strength between said adhesive tape and said film is greater than the tear resistance of said film.

2. The casing as claimed in claim 1, wherein the edges of said film which extend in the longitudinal direction of said tubing abut each other.

3. The casing as claimed in claim 1, wherein the edges of said film which extend in the longitudinal direction of said tubing overlap.

4. The casing as claimed in claim 1, wherein said incisions extend perpendicularly to said at least one longitudinal edge of said adhesive tape.

5. The casing as claimed in claim 1, wherein said incisions extend from both longitudinal edges of said adhesive tape.

6. The casing as claimed in claim 1, wherein said incisions have mutual distances between themselves of from about 0.5 to 10 mm.

7. The casing as claimed in claim 6, wherein said incisions have mutual distances between themselves of from 0.5 to 5 mm.

8. The casing as claimed in claim 1, wherein the length of said incisions is about 0.3 to 2 mm.

9. The casing as claimed in claim 8, wherein the length of said incisions is 0.5 to 1 mm.

10. The casing as claimed in claim 1, wherein the width of said adhesive tape is about 6 to 15 mm.

11. The casing as claimed in claim 10, wherein the width of said adhesive tape is 8 to 12 mm.

12. The casing as claimed in claim 1, wherein said adhesive tape comprises a support film and an adhesive layer.

13. The casing as claimed in claim 12, wherein said adhesive layer comprises a pressure-sensitive adhesive.

14. The casing as claimed in claim 1, wherein at least the external surface of said film and that surface of said adhesive tape which enters into contact with said film comprise a heat-sealable material, and wherein said film and said adhesive tape are bonded to one another by heat sealing.

15. The casing as claimed in claim 1, wherein said film comprises at least one layer of a plastic material.

16. The casing as claimed in claim 15, wherein said plastic material is a polyamide, a polyolefin, polyvinylidene chloride, polyvinyl alcohol or a polyester.

17. The casing as claimed in claim 1, wherein said film comprises cellulose.

18. The casing as claimed in claim 17, wherein said film further comprises a plastic coating.

19. The casing as claimed in claim 18, wherein said plastic coating is heat-sealable.

20. A sausage product comprising a sausage meat emulsion and a casing as claimed in claim 1.

* * * * *